(12) United States Patent
Itoh

(10) Patent No.: US 11,736,805 B2
(45) Date of Patent: Aug. 22, 2023

(54) IMAGE CAPTURE APPARATUS HAVING FIRST AND SECOND AMPLIFICATION UNITS AND CONTROL METHOD FOR SAME

(71) Applicant: CANON KABUSHIKI KAISHA, Tokyo (JP)

(72) Inventor: Yasuhiro Itoh, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/688,562

(22) Filed: Mar. 7, 2022

(65) Prior Publication Data

US 2022/0191376 A1 Jun. 16, 2022

Related U.S. Application Data

(63) Continuation of application No. 16/936,165, filed on Jul. 22, 2020, now Pat. No. 11,297,251.

(30) Foreign Application Priority Data

Jul. 26, 2019 (JP) .................................. 2019-137960

(51) Int. Cl.
H04N 23/72 (2023.01)
(52) U.S. Cl.
CPC .................................. H04N 23/72 (2023.01)
(58) Field of Classification Search
CPC . H04N 5/353–3537; H04N 5/235–243; H04N 5/378; H04N 5/3355; H04N 5/3745–37455; G03B 7/00–28; G03B 2207/00–005; H03M 1/00–645

USPC .................................................. 341/155–172
See application file for complete search history.

(56) References Cited

U.S. PATENT DOCUMENTS

2010/0177225 A1 7/2010 Cieslinski
2013/0147979 A1* 6/2013 McMahon ............. H04N 5/335
348/218.1

FOREIGN PATENT DOCUMENTS

JP 2009-296423 A 12/2009
JP 2009-303010 A 12/2009
JP 2016-129397 A 7/2016

* cited by examiner

*Primary Examiner* — Xi Wang
(74) *Attorney, Agent, or Firm* — Canon U.S.A., Inc. IP Division

(57) ABSTRACT

An image capture apparatus includes a photoelectric conversion unit, an acquisition unit, a first amplification unit, a second amplification unit, and an amplification factor control unit. The photoelectric conversion unit is configured to convert an optical image into an image signal. The acquisition unit is configured to acquire a value related to a correct exposure on a basis of the image signal converted from the optical image by the photoelectric conversion unit. The first amplification unit is configured to amplify the image signal with a first amplification factor. The second amplification unit is configured to amplify the image signal with a second amplification factor. The amplification factor control unit is configured to change the first amplification factor or the second amplification factor based on the value related to the correct exposure.

6 Claims, 8 Drawing Sheets

FIG.5
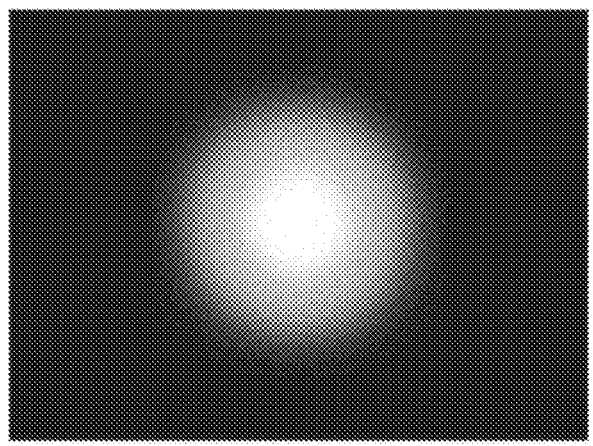
HIGH　　　　　　　　　　　　LOW
WEIGHT

IMAGE CAPTURE APPARATUS HAVING FIRST AND SECOND AMPLIFICATION UNITS AND CONTROL METHOD FOR SAME

CROSS-REFERENCE TO RELATED APPLICATION

This application is a Continuation of U.S. application Ser. No. 16/936,165, filed Jul. 22, 2020, which claims priority from Japanese Patent Application No. 2019-137960, filed Jul. 26, 2019, which are hereby incorporated by reference herein in their entireties.

BACKGROUND

Field

One disclosed aspect of the embodiments relates to an image capture apparatus and a control method for an image capture apparatus.

Description of the Related Art

It is important to improve a signal-to-noise (S/N) ratio of an image capture apparatus. A general image capture apparatus includes one amplification circuit for one photoelectric conversion element to amplify an electrical signal generated by the photoelectric conversion element. In this regard, to improve the S/N ratio, there is known an image capture apparatus that amplifies an electric signal generated by a photoelectric conversion element by two amplification circuits (see, for example, Japanese Patent Application Laid-Open No. 2016-129397 and United States Patent Application Publication No. 2010/0177225). Such an image capture apparatus selects either of two amplified electric signals based on a luminance and generates one image, and thereby can improve the S/N ratio.

However, in the techniques of Japanese Patent Application Laid-Open No. 2016-129397 and United States Patent Application Publication No. 2010/0177225, an amplification factor of the electric signal is preset before imaging. Thus, in a case where a luminance distribution changes rapidly, such as in outdoor imaging, if the preset amplification factor is used with the techniques of Japanese Patent Application Laid-Open No. 2016-129397 and United States Patent Application Publication No. 2010/0177225, there is an issue in that the effect of improving the S/N ratio is limited to part of a luminance range and a sufficient effect cannot be obtained.

SUMMARY

According to an aspect of the disclosure, an image capture apparatus includes a photoelectric conversion unit, an acquisition unit, a first amplification unit, a second amplification unit, and an amplification factor control unit. The photoelectric conversion unit is configured to convert an optical image into an image signal. The acquisition unit is configured to acquire a value related to a correct exposure on a basis of the image signal converted from the optical image by the photoelectric conversion unit. The first amplification unit is configured to amplify the image signal with a first amplification factor. The second amplification unit is configured to amplify the image signal with a second amplification factor. The amplification factor control unit is configured to change the first amplification factor or the second amplification factor based on the value related to the correct exposure.

Further features of the disclosure will become apparent from the following description of exemplary embodiments with reference to the attached drawings.

BRIEF DESCRIPTION OF THE DRAWINGS

FIG. 5 is a diagram illustrating weight of brightness.

DESCRIPTION OF THE EMBODIMENTS

Hereinafter, the disclosure will be described in detail on the basis of exemplary embodiments with reference to the accompanying drawings. Configurations illustrated in the following exemplary embodiments are merely examples, and the disclosure is not necessarily limited to the illustrated configurations.

Figure 1:
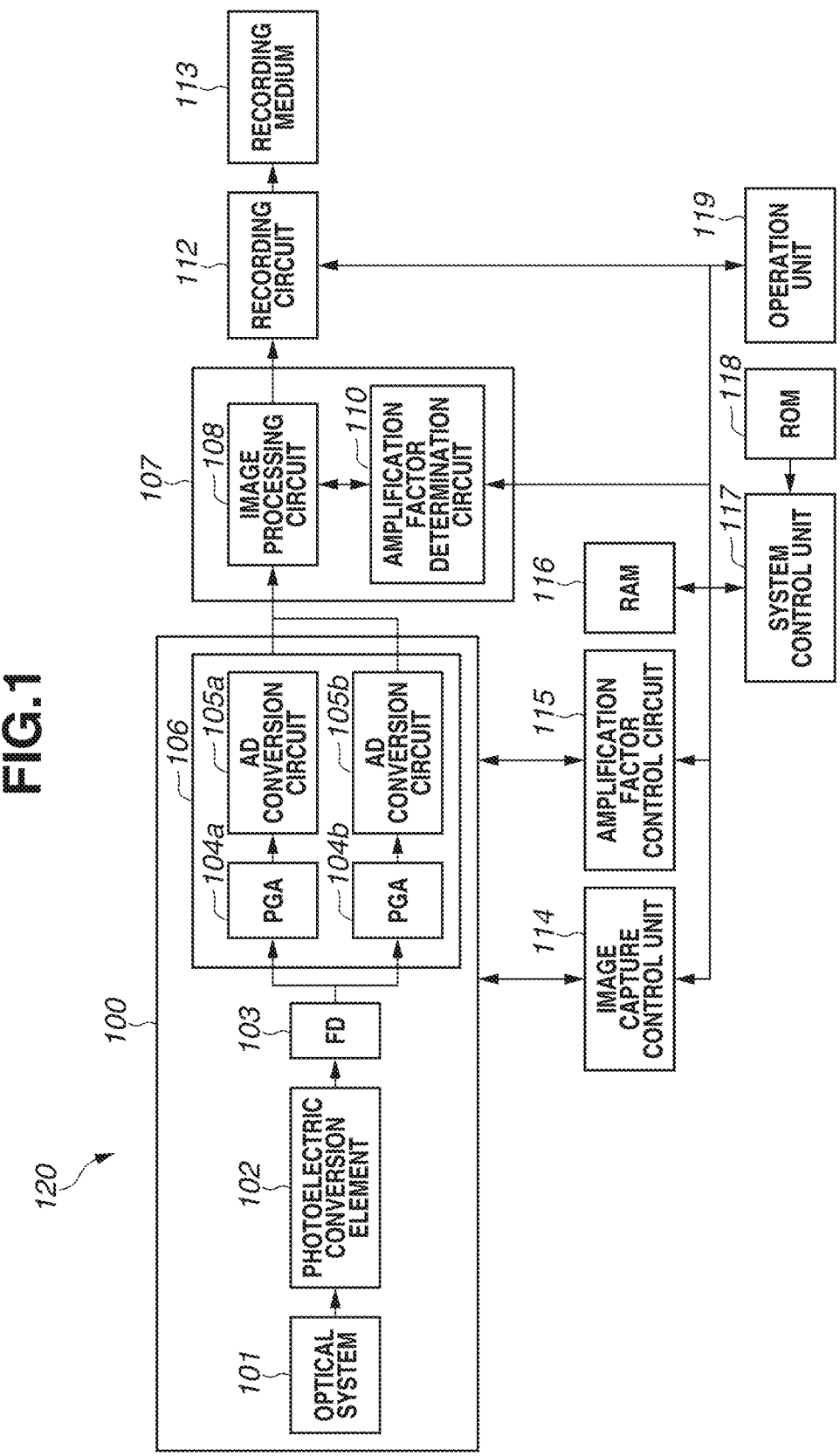
FIG. 1 is a block diagram illustrating a configuration example of an image capture apparatus according to a first exemplary embodiment.

FIG. 1 is a diagram illustrating a configuration example of an image capture apparatus 120 according to a first exemplary embodiment. The image capture apparatus 120 includes an image capturing device 100, a digital signal processing circuit 107, a recording circuit 112, a recording medium 113, an image capture control unit 114, an amplification factor control circuit 115, a random access memory (RAM) 116, a system control unit 117, a read only memory (ROM) 118, and an operation unit 119.

The image capturing device 100 includes an optical system 101, a photoelectric conversion element 102, a floating diffusion (FD) 103, and an analog signal processing circuit 106. The analog signal processing circuit 106 includes programmable gain amplifiers (PGAs) 104a and 104b, and analog to digital (AD) conversion circuits 105a and 105b. The digital signal processing circuit 107 includes an image processing circuit 108 and an amplification factor determination circuit 110.

The image capturing device 100 converts an optical image of a subject into an image. The optical system 101 includes a lens and a diaphragm. The photoelectric conversion element 102 converts the optical image of the subject into an electric charge. The FD 103 converts the electric charge obtained by the conversion by the photoelectric conversion element 102 into a voltage. The photoelectric conversion element 102 and the FD 103 constitute a photoelectric conversion unit that converts the optical image into an image signal (voltage).

The analog signal processing circuit 106 performs signal processing on the image signal obtained by the conversion by the FD 103. The PGA 104*a* is an amplification unit that amplifies the image signal obtained by the conversion by the FD 103 with an amplification factor Ga. The PGA 104*b* is an amplification unit that amplifies the image signal obtained by the conversion by the FD 103 with an amplification factor Gb. The AD conversion circuit 105*a* is an AD conversion unit that performs AD conversion on the image signal amplified by the PGA 104*a* and outputs an image. The AD conversion circuit 105*b* is an AD conversion unit that performs AD conversion on the image signal amplified by the PGA 104*b* and outputs an image.

The image processing circuit 108 is a combining unit that performs development processing and combining processing on the image output by the AD conversion circuit 105*a* and the image output by the AD conversion circuit 105*b* and outputs an image. The amplification factor determination circuit 110 determines a capacitance of the FD 103, the amplification factor Ga of the PGA 104*a*, and the amplification factor Gb of the PGA 104*b* on the basis of an instruction from a user. Details will be described below.

The recording circuit 112 records the image output from the image processing circuit 108 in the recording medium 113. The recording medium 113 is, for example, a memory card or a hard disk drive, and stores an image.

The system control unit 117 controls each component of the image capture apparatus 120. The ROM 118 is a nonvolatile memory that stores a program executed by the system control unit 117 and control data such as a control parameter. The RAM 116 is a volatile memory used as a work area by the system control unit 117 performing the control.

The image capture control unit 114 controls the image capturing device 100 based on the control by the system control unit 117. The amplification factor control circuit 115 is an amplification factor control unit, and changes settings of the capacitance of the FD 103, the amplification factor Ga of the PGA 104*a*, and the amplification factor Gb of the PGA 104*b* to thereby control the amplification factor for the image signal (voltage). The operation unit 119 receives an instruction from the user or an externally connected device such as a release.

Figure 2:
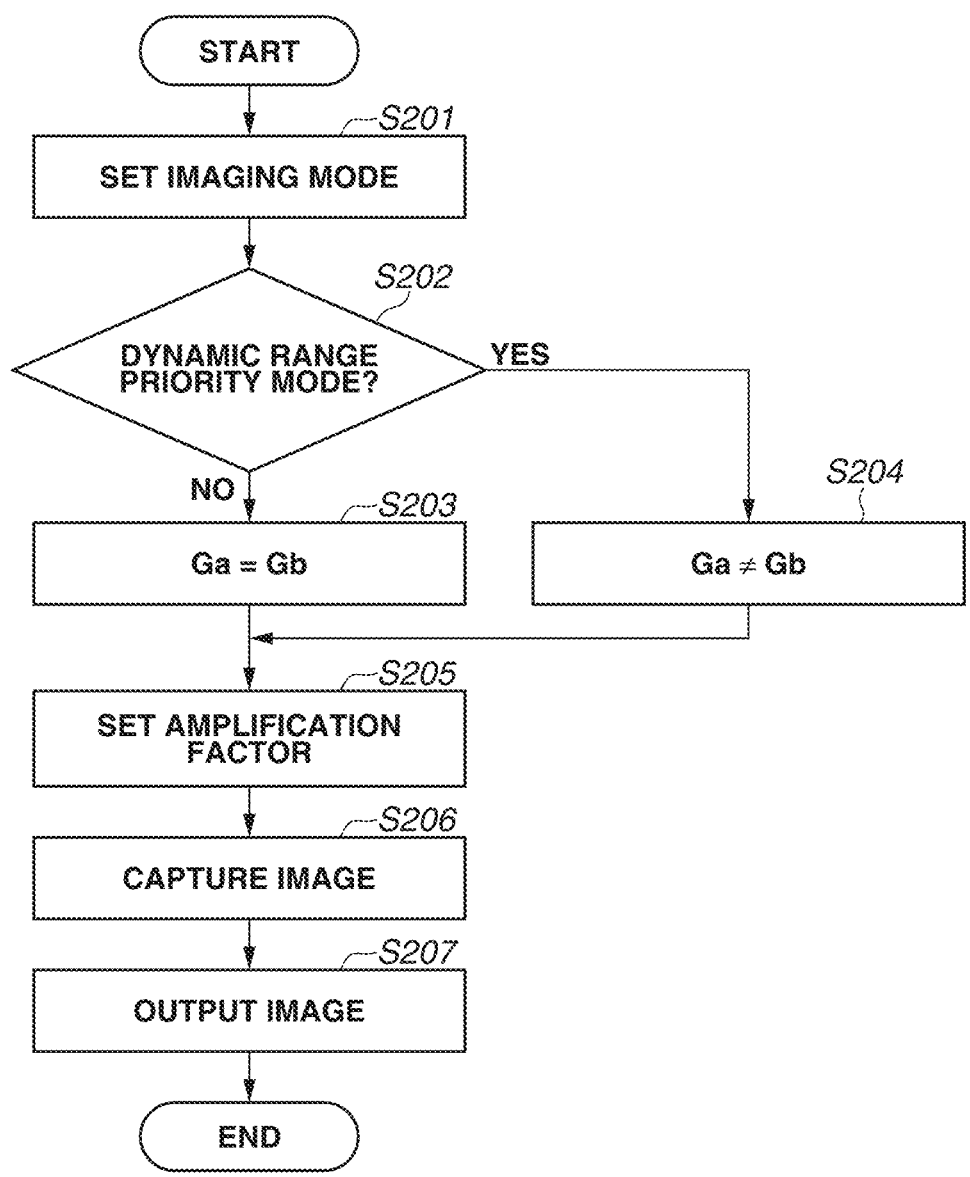
FIG. 2 is a flowchart illustrating a control method for the image capture apparatus according to the first exemplary embodiment.

FIG. 2 is a flowchart illustrating a control method for the image capture apparatus 120 according to the first exemplary embodiment. First, in step S201, the system control unit 117 sets an imaging mode based on the operation performed on the operation unit 119. For example, the system control unit 117 sets a dynamic range priority mode or a low noise priority mode as the imaging mode based on a user operation performed on the operation unit 119.

Next, in step S202, the system control unit 117 determines whether the imaging mode set in step S201 is the dynamic range priority mode. If the system control unit 117 determines that the imaging mode is the dynamic range priority mode (YES in step S202), the processing proceeds to step S204. If the imaging mode is not the dynamic range priority mode (NO in step S202), the processing proceeds to step S203.

In step S203, the amplification factor determination circuit 110 determines the capacitance of the FD 103, the amplification factor Ga of the PGA 104*a*, and the amplification factor Gb of the PGA 104*b*. More specifically, the amplification factor determination circuit 110 determines the amplification factor Ga of the PGA 104*a* and the amplification factor Gb of the PGA 104*b* in such a manner that the amplification factor Ga of the PGA 104*a* and the amplification factor Gb of the PGA 104*b* are the same. For example, if the amplification factor Ga that can be set on the PGA 104*a* and the amplification factor Gb that can be set on the PGA 104*b* are each "1", "2", "4" or "8", the amplification factor determination circuit 110 determines both the amplification factor Ga of the PGA 104*a* and the amplification factor Gb of the PGA 104*b* to be "4". Subsequently, the processing proceeds to step S205.

In step S204, the amplification factor determination circuit 110 determines the capacitance of the FD 103, the amplification factor Ga of the PGA 104*a*, and the amplification factor Gb of the PGA 104*b*. More specifically, the amplification factor determination circuit 110 determines the amplification factor Ga of the PGA 104*a* and the amplification factor Gb of the PGA 104*b* in such a manner that the amplification factor Ga of the PGA 104*a* and the amplification factor Gb of the PGA 104*b* are different. For example, if the amplification factor Ga that can be set on the PGA 104*a* and the amplification factor Gb that can be set on the PGA 104*b* are each "1", "2", "4" or "8", the amplification factor determination circuit 110 determines the amplification factor Ga of the PGA 104*a* to be "1" and the amplification factor Gb of the PGA 104*b* to be "8". Subsequently, the processing proceeds to step S205.

In step S205, the amplification factor control circuit 115 sets, to the image capturing device 100, the capacitance of the FD 103, the amplification factor Ga of the PGA 104*a*, and the amplification factor Gb of the PGA 104*b* on the basis of the capacitance and the amplification factors Ga and Gb determined in step S203 or S204. The amplification factor control circuit 115 can change the setting of the amplification factor Ga or the amplification factor Gb.

Next, in step S206, the image capture control unit 114 causes the image capturing device 100 to start an imaging operation in response to the operation performed on the operation unit 119. First, the image capture control unit 114 drives the lens and diaphragm of the optical system 101 to form an optical image of a subject on the photoelectric conversion element 102. An exposure time of the photoelectric conversion element 102 is controlled by the image capture control unit 114. The photoelectric conversion element 102 converts the optical image into an electric charge, and transfers the electric charge to the FD 103. The FD 103 converts the electric charge into a voltage. The PGA 104*a* amplifies the voltage obtained by the conversion by the FD 103 with the amplification factor Ga. The PGA 104*b* amplifies the voltage obtained by the conversion by the FD 103 with the amplification factor Gb. The AD conversion circuit 105*a* performs AD conversion on the voltage amplified by the PGA 104*a*, and outputs an image. The AD conversion circuit 105*b* performs AD conversion on the voltage amplified by the PGA 104*b*, and outputs an image. The image processing circuit 108 performs development processing and then combining processing on the image output by the AD conversion circuit 105*a* and the image output by the AD conversion circuit 105*b*. The combining processing will be described below.

Next, in step S207, the image processing circuit 108 outputs a combining-processed image to the recording circuit 112. The recording circuit 112 converts the image into an image in a data format suitable for the recording medium 113, and records the image in the recording medium 113.

Here, the image combining processing performed in step S206 will be described. The image processing circuit 108 performs the combining processing by different methods for the amplification factors Ga and Gb.

If the amplification factors Ga and Gb are different, two images output by the AD conversion circuits 105*a* and 105*b*, respectively, have different dynamic ranges, and some luminance areas overlap. In such a case, with regard to a pixel where luminance ranges of the two images output by the AD conversion circuits 105a and 105b overlap, the image processing circuit 108 selects a pixel with good image quality from the two images output by the AD conversion circuits 105a and 105b. For example, the image processing circuit 108 selects a pixel of an image corresponding to a high amplification factor of the amplification factors Ga and Gb, as the pixel with good image quality. In addition, with regard to a bright pixel where the luminance ranges of the two images output by the AD conversion circuits 105a and 105b do not overlap, the image processing circuit 108 selects a pixel of an image corresponding to a low amplification factor of the amplification factors Ga and Gb. In the dynamic range priority mode, the image processing circuit 108 can generate an image with a wide dynamic range by combining the two images output by the AD conversion circuits 105a and 105b.

If the amplification factors Ga and Gb are the same, the image processing circuit 108 performs averaging processing on pixel values of pixels at the same position in the two images output by the AD conversion circuits 105a and 105b. In the low noise priority mode, the image processing circuit 108 performs the averaging processing to reduce the noise of an image, and thereby can obtain an image with an improved signal-to-noise (S/N) ratio.

In the first exemplary embodiment, the image capture apparatus 120 can generate an image where the dynamic range is prioritized or an image where an improvement of the S/N ratio is prioritized on the basis of the intention of the user.

Figure 3:
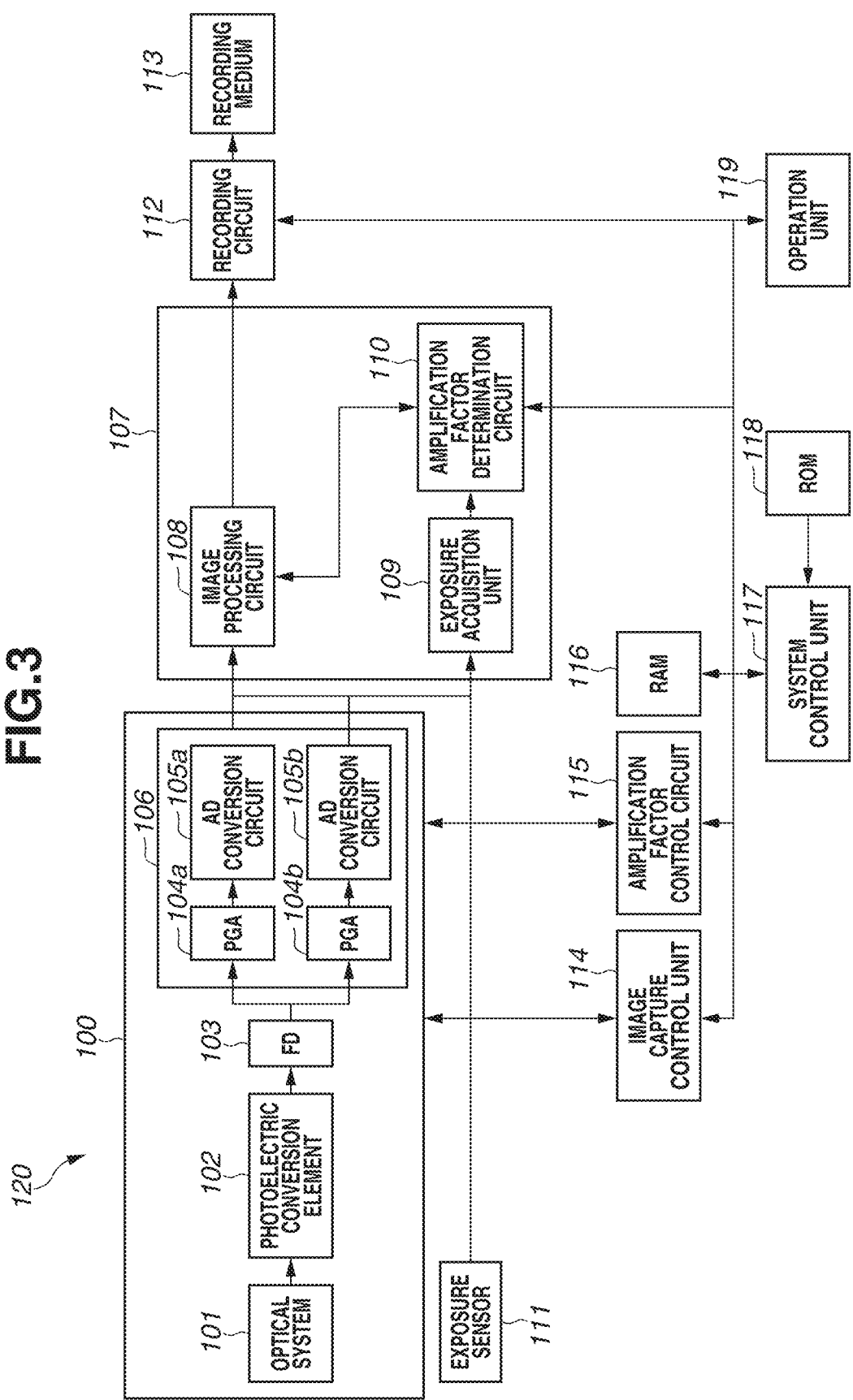
FIG. 3 is a block diagram illustrating a configuration example of an image capture apparatus according to a second exemplary embodiment.

FIG. 3 is a diagram illustrating a configuration example of an image capture apparatus 120 according to a second exemplary embodiment. The image capture apparatus 120 of FIG. 3 includes an exposure acquisition unit 109 and an exposure sensor 111, which are added to the image capture apparatus 120 of FIG. 1. The image capture apparatus 120 according to the present exemplary embodiment has a function to automatically perform exposure. Hereinafter, differences between the second exemplary embodiment and the first exemplary embodiment will be described.

The exposure sensor 111 is, for example, an image sensor such as a complementary metal oxide semiconductor (CMOS) sensor, and detects brightness (luminance) of an optical image of a subject on the basis of the pixel value. The exposure sensor 111 may be an image sensor having a smaller number of pixels than the number of pixels of the image sensor for imaging, but may have a larger number of pixels than the number of pixels of the image sensor for imaging. The exposure sensor 111 outputs luminance data (luminance distribution) of each pixel.

The exposure acquisition unit 109 acquires an exposure value (EV) of automatic exposure as a value related to a correct exposure on the basis of the luminance data output by the exposure sensor 111 or an image output by the image capturing device 100. The amplification factor determination circuit 110 determines the amplification factor Ga of the PGA 104a and the amplification factor Gb of the PGA 104b on the basis of the EV acquired by the exposure acquisition unit 109.

Figure 4:
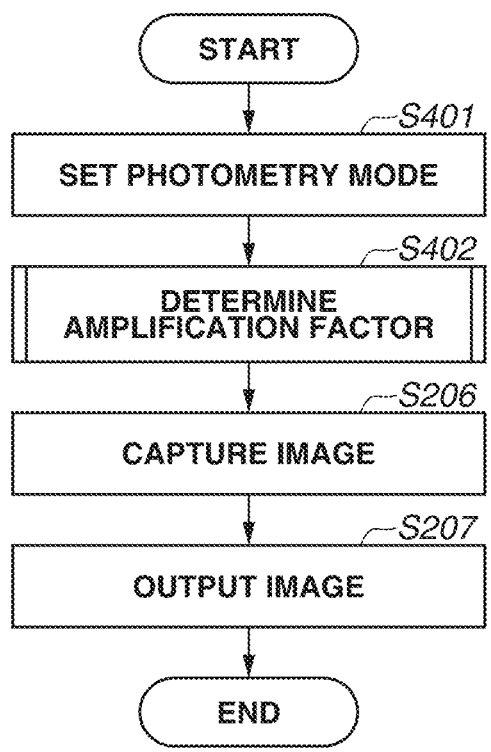
FIG. 4 is a flowchart illustrating a control method for the image capture apparatus according to the second exemplary embodiment.

FIG. 4 is a flowchart illustrating a control method for the image capture apparatus 120 according to the second exemplary embodiment. First, in step S401, the system control unit 117 sets a photometry mode of the image capturing device 100 and a photometry mode of the exposure sensor 111 in response to a user operation performed on the operation unit 119. The photometry mode includes a center-weighted photometry mode, an evaluation photometry mode, and a spot photometry mode.

As illustrated in FIG. 5, the center-weighted photometry mode is a mode where the brightness of the image is calculated in such a manner that the weight of brightness (luminance) is maximized at the center of the image and the weight of brightness is reduced as it gets farther away from the center. The evaluation photometry mode is a mode where the brightness of the entire image is averaged to calculate the brightness of the image. The spot photometry mode is a mode where the weight of a specific area such as a focus point is increased to calculate the brightness of the image.

For example, the system control unit 117 sets the photometry mode of the image capturing device 100 to the center-weighted photometry mode and sets the photometry mode of the exposure sensor 111 to the evaluation photometry mode.

Next, in step S402, when a shutter button of the operation unit 119 is half pressed, the system control unit 117 instructs the image capturing device 100 to perform pre-imaging. The pre-imaging is performed immediately before imaging in step S206 described below. The amplification factor determination circuit 110 determines the capacitance of the FD 103, the amplification factor Ga of the PGA 104a, and the amplification factor Gb of the PGA 104b on the basis of the pre-imaging. The amplification factor control circuit 115 sets, to the image capturing device 100, the capacitance of the FD 103, the amplification factor Ga of the PGA 104a, and the amplification factor Gb of the PGA 104b, on the basis of the capacitance of the FD 103, the amplification factor Ga, and the amplification factor Gb determined by the amplification factor determination circuit 110. Details of step S402 will be described below with reference to FIG. 6.

Next, in step S206, when the shutter button of the operation unit 119 is fully pressed, the image capture apparatus 120 performs the same processing as the processing in step S206 of FIG. 2. Then, in step S207, the image capture apparatus 120 performs the same processing as the processing in step S207 of FIG. 2.

Figure 6:
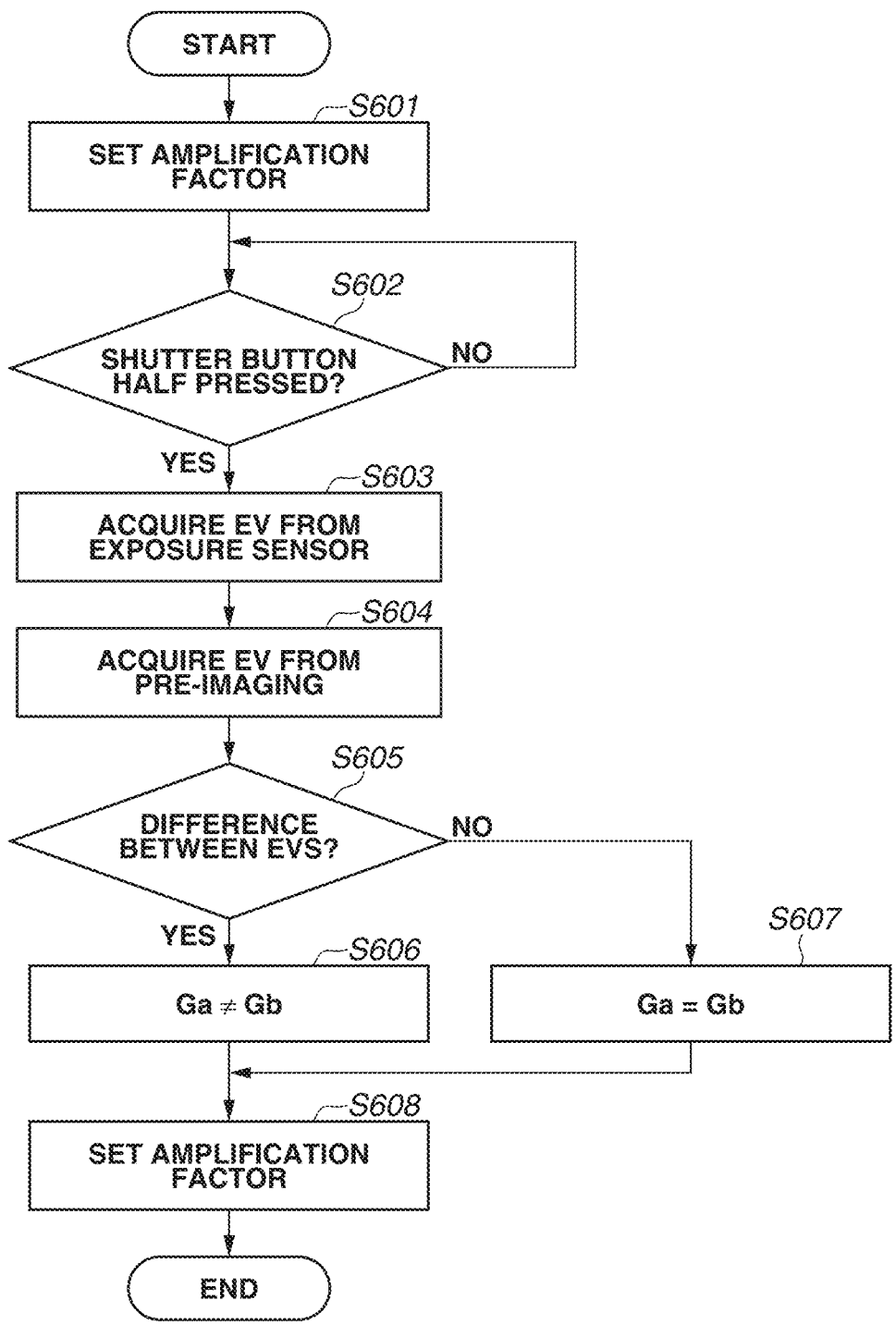
FIG. 6 is a flowchart illustrating a method for determining an amplification factor.

FIG. 6 is a flowchart illustrating the details of step S402 of FIG. 4. First, in step S601, the amplification factor control circuit 115 sets, to the image capturing device 100, an initial value of the capacitance of the FD 103, an initial value of the amplification factor Ga of the PGA 104a, and an initial value of the amplification factor Gb of the PGA 104b. For example, the amplification factor Ga that can be set on the PGA 104a and the amplification factor Gb that can be set on the PGA 104b are each "1", "2", "4" or "8". In such a case, the amplification factor control circuit 115 sets "2" as initial values of both the amplification factor Ga of the PGA 104a and the amplification factor Gb of the PGA 104b.

Next, in step S602, the system control unit 117 waits until the shutter button of the operation unit 119 is half pressed. If the shutter button of the operation unit 119 is half pressed (YES in step S602), the processing proceeds to step S603.

Next, in step S603, the exposure acquisition unit 109 acquires the EV of automatic exposure with the use of the luminance data output by the exposure sensor 111 on the basis of the photometry mode of the exposure sensor 111 set in step S401. Since the photometry mode of the exposure sensor 111 is set to the evaluation photometry mode, the exposure acquisition unit 109 acquires the EV on the basis of the average value of the luminance data of each pixel output by the exposure sensor 111. The exposure acquisition unit 109 holds a table 700 illustrated in FIG. 7. The table 700 indicates a correspondence relation among an average value 701 of the luminance data, an EV 702, and an amplification factor 703. The exposure acquisition unit 109 refers to the table 700 and acquires the EV 702 on the basis of the average value 701 of the luminance data of each pixel output by the exposure sensor 111. The EV 702 is an exposure value obtained by performing photometry on the optical image in the evaluation photometry mode.

Next, in step S604, the image capture control unit 114 causes the image capturing device 100 to start pre-imaging. The image capturing device 100 outputs the image output by the AD conversion circuit 105*a* and/or 105*b* as red-green-blue (RGB) data. The RGB data is the data regarding red (R), green (G), and blue (B). The exposure acquisition unit 109 acquires the EV of automatic exposure with the use of the RGB data about image output by the image capturing device 100 on the basis of the photometry mode of the exposure sensor 111 set in step S401. Since the photometry mode of the image capturing device 100 is set to the center-weighted photometry mode, the exposure acquisition unit 109 first calculates luminance data Y of each pixel of the image output by the image capturing device 100 from the RGB data about the relevant pixel using the following formula. In the formula, R represents red data in the RGB data, G represents green data in the RGB data, and B represents blue data in the RGB data. The method for calculating the luminance data Y is not limited to the following formula.

$$Y = 0.2126 \times R + 0.587 \times G + 0.114 \times B$$

Figure 7:
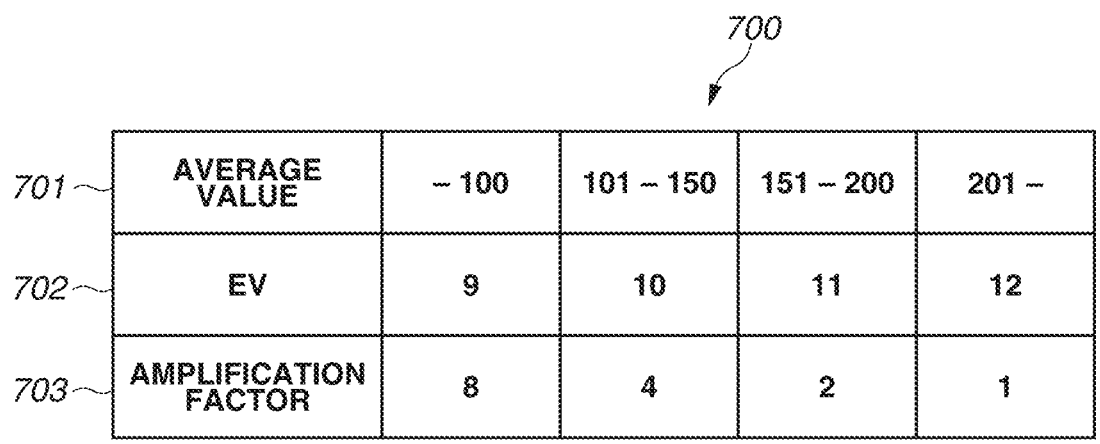
FIG. 7 is a diagram illustrating a table of correspondence relation.

Next, the exposure acquisition unit 109 multiplies the luminance data Y of each pixel by the weight illustrated in FIG. 5, refers to the table 700 in FIG. 7, and acquires the EV 702 from the average value 701 of multiplication results. This EV 702 is an exposure value obtained by performing photometry on the optical image in the center-weighted photometry mode.

Next, in step S605, the amplification factor determination circuit 110 determines whether there is a difference between the EV of the exposure sensor 111 acquired in step S603 and the EV of the image capturing device 100 acquired in step S604. If the amplification factor determination circuit 110 determines that there is a difference between the EVs (YES in step S605), the processing proceeds to step S606. If the amplification factor determination circuit 110 determines that there is no difference between the EVs (NO in step S605), the processing proceeds to step S607. In other words, if the amplification factor determination circuit 110 determines that the EVs acquired in steps S603 and S604 are different, the processing proceeds to step S606. If the amplification factor determination circuit 110 determines that the EVs acquired in steps S603 and S604 are the same, the processing proceeds to step S607.

Figure 8:
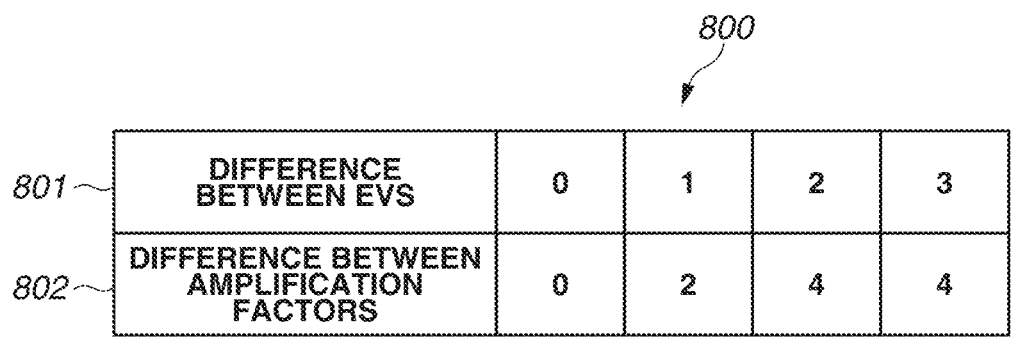
FIG. 8 is a diagram illustrating another table of correspondence relation.

In step S606, the amplification factor determination circuit 110 determines the capacitance of the FD 103, the amplification factor Ga of the PGA 104*a*, and the amplification factor Gb of the PGA 104*b*. More specifically, the amplification factor determination circuit 110 determines the amplification factor Ga of the PGA 104*a* and the amplification factor Gb of the PGA 104*b* in such a manner that the amplification factor Ga of the PGA 104*a* and the amplification factor Gb of the PGA 104*b* are different. For example, the amplification factor determination circuit 110 holds a table 800 illustrated in FIG. 8. The table 800 indicates a correspondence relation between a difference 801 between EVs and a difference 802 between amplification factors. The difference 801 between EVs is the difference between the EV acquired in step S603 and the EV acquired in step S604. The difference 802 between amplification factors is the difference between the amplification factors Ga and Gb. The amplification factor determination circuit 110 refers to the table 800 and acquires the difference 802 between amplification factors on the basis of the difference 801 between the EV acquired in step S603 and the EV acquired in step S604. The amplification factor determination circuit 110 determines the amplification factor Ga of the PGA 104*a* and the amplification factor Gb of the PGA 104*b* in such a manner that the difference between the amplification factors Ga and Gb is the difference 802 between amplification factors.

For example, the amplification factor determination circuit 110 determines the initial value of the amplification factor Ga of step S601 as the amplification factor Ga of the PGA 104*a*. In addition, the amplification factor determination circuit 110 determines, as the amplification factor Gb of the PGA 104*b*, an amplification factor obtained by multiplying the initial value of the amplification factor Gb of step S601 by the difference 802 between amplification factors. If the amplification factor Gb exceeds a maximum value that can be set as a result of multiplication, the amplification factor determination circuit 110 determines the maximum value that can be set as the amplification factor Gb of the PGA 104*b*. Subsequently, the processing proceeds to step S608.

In step S607, the amplification factor determination circuit 110 determines the capacitance of the FD 103, the amplification factor Ga of the PGA 104*a*, and the amplification factor Gb of the PGA 104*b*. More specifically, the amplification factor determination circuit 110 determines the amplification factor Ga of the PGA 104*a* and the amplification factor Gb of the PGA 104*b* in such a manner that the amplification factor Ga of the PGA 104*a* and the amplification factor Gb of the PGA 104*b* are the same. For example, the amplification factor determination circuit 110 determines the amplification factors Ga and Gb having the same value on the basis of the EV of the exposure sensor 111 acquired in step S603. Subsequently, the processing proceeds to step S608.

In step S608, the amplification factor control circuit 115 sets, to the image capturing device 100, the capacitance of the FD 103, the amplification factor Ga of the PGA 104*a*, and the amplification factor Gb of the PGA 104*b* on the basis of the capacitance, the amplification factor Ga, and the amplification factor Gb determined in step S606 or S607.

In step S206 of FIG. 4, if the amplification factors Ga and Gb are different, the image processing circuit 108 can generate an image with a wide dynamic range by combining the two images output by the AD conversion circuits 105*a* and 105*b*. If the amplification factors Ga and Gb are the same, the image processing circuit 108 performs the averaging processing on the two images output by the AD conversion circuits 105*a* and 105*b* to reduce the noise of the images, and thereby can obtain an image with an improved S/N ratio. The image capture apparatus 120 can generate an image with a high S/N ratio of a main subject on the basis of the intention of the user.

In the second exemplary embodiment, an image capture apparatus having a function to perform automatic exposure has been described as an example, while the image capture apparatus does not necessarily need to have an automatic exposure function. The same effect as in the second exemplary embodiment can be exhibited as long as the image capture apparatus can acquire a correct exposure on the basis of at least the luminance of a scene.

Each of the above-described exemplary embodiments is merely an example of an embodiment in carrying out the disclosure, and the technical scope of the disclosure should not be limitedly interpreted by these. The disclosure can be implemented in various forms without departing from the technical idea or main features thereof.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image capture apparatus comprising:
an image capturing device configured to convert an optical image into plural images based on plural image signals;
a control circuitry configured to set an imaging mode from among a first imaging mode and a second imaging mode;
an amplification factor control circuitry configured to set at least one of amplification factors based on the set imaging mode; and
an output circuitry configured to output a combined image by combining the plural images output from the image capturing device,
wherein the image capturing device includes:
a first photoelectric conversion element configured to convert the optical image into an electric charge, and
an amplification circuitry configured to generate the plural image signals, in the first imaging mode, by amplifying an image signal that is based on the electric charge with a first amplification factor and a second amplification factor different from first amplification factor, and configured to generate the plural image signals, in the second imaging mode, by amplifying an image signal that is based on the electric charge with an identical amplification factor, and
wherein the output circuitry outputs, in the second imaging mode, a low noise image by combining the plural images generated with the identical amplification factor to reduce noise.

2. The image capture apparatus according to claim 1, wherein the amplification circuitry includes a first amplification circuitry having the first amplification factor and a second amplification circuitry having the second amplification factor and generates, in the second imaging mode, the plural image signals with the first amplification circuitry and with the second amplification circuitry, wherein the first amplification factor of the first amplification circuitry is identical to the second amplification factor of the second amplification circuitry.

3. The image capture apparatus according to claim 2, wherein the image capturing device further includes:
a first analog to digital conversion circuitry configured to perform analog to digital conversion on the image signal amplified by the first amplification circuitry; and
a second analog to digital conversion circuitry configured to perform analog to digital conversion on the image signal amplified by the second amplification circuitry.

4. The image capture apparatus according to claim 3, wherein the output circuitry is further configured to combine a first digital image resulting from the analog to digital conversion performed by the first analog to digital conversion circuitry and a second digital image resulting from the analog to digital conversion performed by the second analog to digital conversion circuitry.

5. The image capture apparatus according to claim 4, wherein
the output circuitry averages, in the second imaging mode, the first digital image and the second digital image.

6. A control method for an image capture apparatus, the control method comprising:
converting an optical image into plural images based on plural image signals;
setting an imaging mode from among a first imaging mode and a second imaging mode;
setting at least one of amplification factors based on the set imaging mode; and
outputting a combined image by combining the plural images output from the image capturing device,
wherein the converting includes:
converting the optical image into an electric charge,
generating the plural image signals, in the first imaging mode, by amplifying an image signal that is based on the electric charge with a first amplification factor and a second amplification factor different from first amplification factor, and generating the plural image signals, in the second imaging mode, by amplifying an image signal that is based on the electric charge with an identical amplification factor,
wherein a low noise image is output, in the second imaging mode, by combining the plural images generated with the identical amplification factor to reduce noise.

* * * * *